3,142,473
BALANCED VALVE ASSEMBLY FOR THE OIL PORT OF A PRESSURE VESSEL
Jean Mercier, 1185 Park Ave., New York, N.Y.
Filed Jan. 12, 1960, Ser. No. 1,939
Claims priority, application France Feb. 5, 1959
10 Claims. (Cl. 251—282)

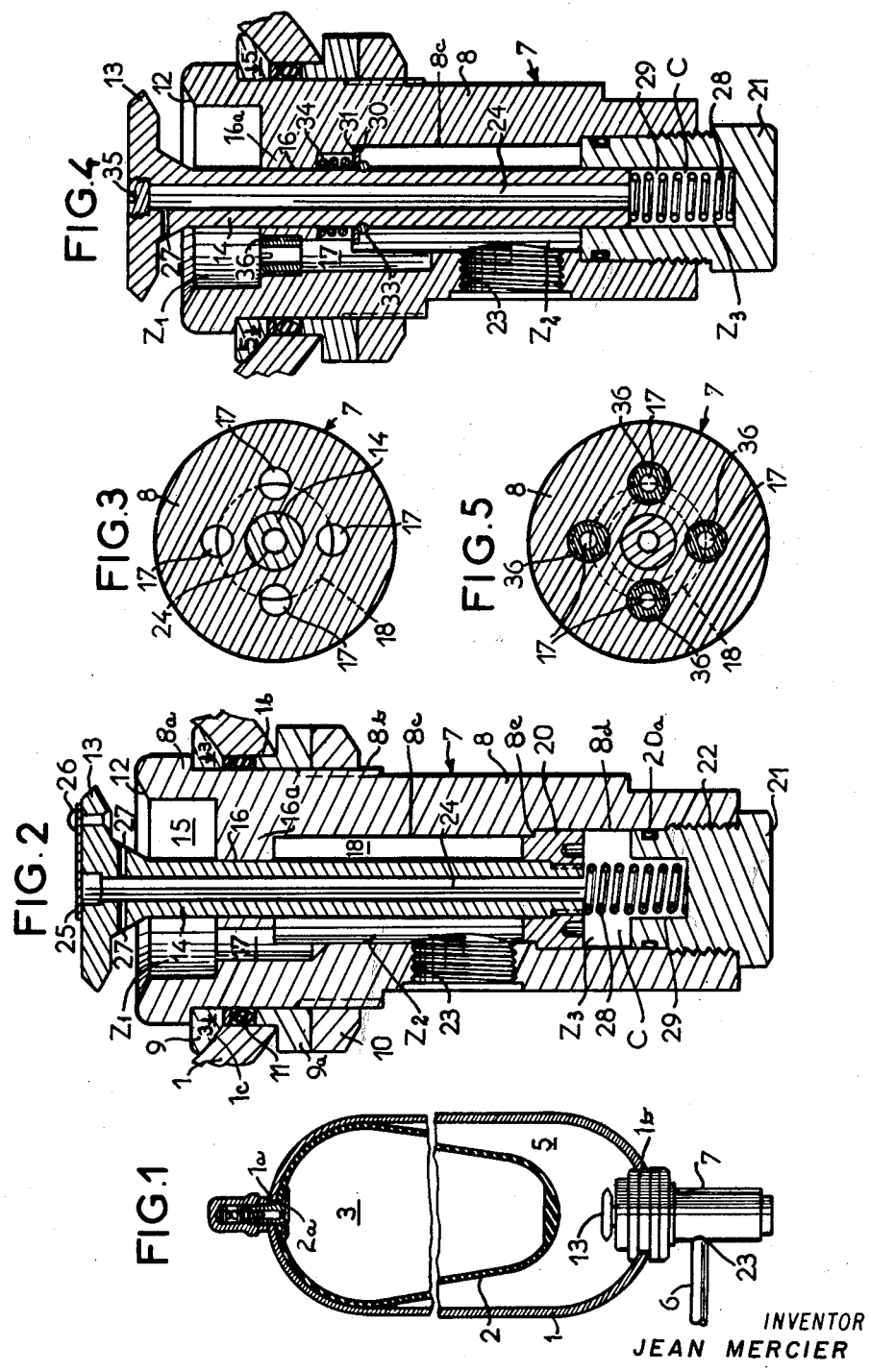

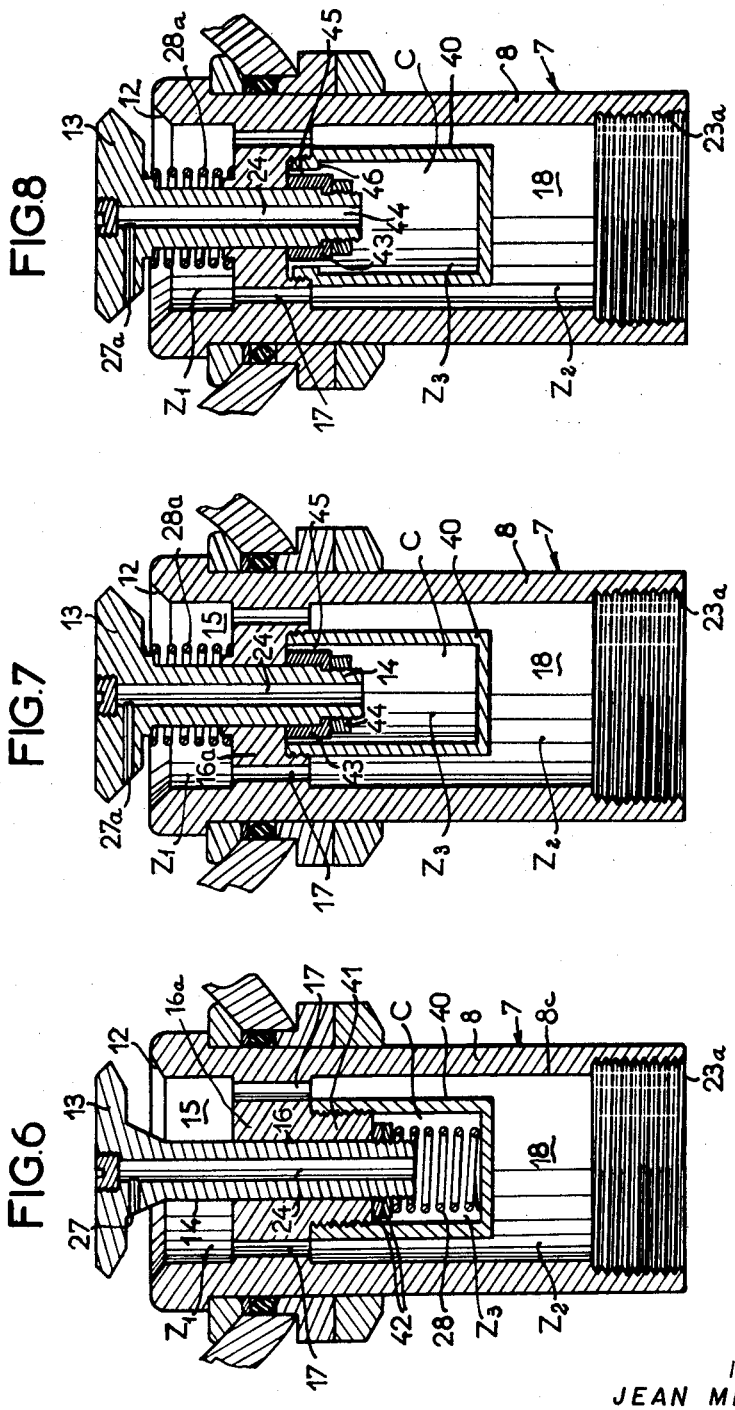

This invention relates to a balanced valve assembly and more particularly to a closure for the outlet port of a pressure vessel, such as a pressure accumulator of the type comprising a rigid container, to be filled with fluids, usually oil and air under pressure, and having a deformable partition intervening between such fluids.

When oil is pumped into the outlet port of the container on one side of the partition, the latter will be deformed further to compress the air on the other side of the partition. Where the closure device for the outlet port is a valve positioned in a tubular member affixed in the outlet port of the accumulator and normally retained in open position, when a control valve connecting the accumulator to the hydraulic device to be operated is opened, the partition will expand toward its original shape to force the oil from the container through the normally open valve.

Where a rapid and profuse flow of oil is required from the accumulator during any short period of time, such as, for example, to operate a circuit breaker, the flow of such fluid past the valve head would result in a low pressure area in the tubular member beneath the valve head, and a high pressure area in the container. As a result, the valve may close almost immediately after the flow of fluid begins, thereby to prevent proper functioning of the equipment to be operated. As the pressure in the system operated by the accumulator can be no greater than the pressure in the container itself, and generally will be less, even with the flow of fluid stopped, the valve will remain closed, with resultant ineffectiveness of the accumulator.

Where, to overcome this difficulty, a relatively strong resilient means is provided to react against the valve head to retain the latter open even with a relatively great differential between the pressure in the container and in the tubular member, if after substantially all of the oil is discharged from the container the valve should still remain open, the partition may be extruded from the outlet, with resultant rupture thereof and failure of the accumulator.

If the resilient means is relatively weak to permit closure of the valve head by reaction of the expanding partition thereagainst when substantially all of the oil has been expelled from the container, premature closing of such valve head will occur by reason of such low pressure area beneath the latter prior to substantially complete expulsion of oil from the container.

It is accordingly among the objects of the invention to provide a closure valve assembly for the outlet port of a pressure accumulator of the above type, which closure valve has but few simple, sturdy parts that may readily be assembled and are not likely to become out of order, and which closure valve will remain open even during profuse, rapid discharge of oil from the accumulator until substantially all of the oil therein has been expelled, yet will dependably close before the partition in the container can be extruded from such outlet port.

According to the invention from its broader aspect, the closure valve has a movable valve head normally in open position and adapted to be closed by pressure of the expanding partition against said head as liquid is discharged from the container. Means are desirably associated with the valve head to prevent premature closing of such valve head, such means varying in effectiveness proportionally to the rate of flow. More particularly, such means in the embodiment shown comprises means to channel a part of the energy produced by the flow of fluid so that it effectively reacts against the valve head to assist in retaining the latter in open position.

In the accompanying drawings in which is shown one or more various possible embodiments of the several features of the invention, FIG. 1 is a partial longitudinal sectional view of the pressure vessel showing the closure valve assembly in elevation, FIG. 2 is a longitudinal sectional view of the closure valve assembly on a greatly enlarged scale, FIG. 3 is a transverse sectional view taken along line 3—3 of FIG. 2, FIG. 4 is a view similar to FIG. 2 of another embodiment of the closure valve assembly, FIG. 5 is a transverse sectional view taken along line 5—5 of FIG. 4, and FIGS. 6, 7 and 8 are views similar to FIG. 2 of still other embodiments of the closure valve assembly.

Referring now to the drawings, the closure assembly 7 is incorporated in a pressure vessel, illustratively a pressure accumulator, which comprises a container 1 of strong rigid material such as steel, capable of withstanding high pressures. The container 1, which illustratively is cylindro-spherical, has opposed ports $1a$, $1b$ at the ends thereof.

Positioned in the container 1 is a deformable partition 2, illustratively a collapsible and expansible bladder, which desirably is of resilient material such as rubber or synthetic plastic of like physical characteristics.

The bladder has a port at one end secured by means of a fitting $2a$ to port $1a$, whereby the interior 3 of the bladder may be charged with a compressible fluid such as air under pressure, and the space 5 exterior of the bladder 2 is adapted to be charged with a fluid such as oil under pressure through the closure assembly 7.

As shown in FIG. 2, the closure assembly 7 is desirably affixed in the port $1b$ so that it may be removed without likelihood of injury to the mechanic. Thus, the assembly comprises a housing 8, preferably a tubular member which desirably has an external annular shoulder $8a$ at the upper end thereof of outer diameter less than that of port $1b$. A locking member 9, illustratively a ring of greater outer diameter than said port $1b$ and deformable to permit its insertion thereinto, encompasses said tubular member and is seated on the rim $1c$ of port $1b$, the inner diameter of said ring 9 being less than the outer diameter of shoulder $8a$ so that said shoulder may seat on said rim. Encompassing said tubular member 8 and in juxtaposition with said port $1b$ is a gasket 11, and a locking ring $9a$ also encompasses said tubular member 8 on the exterior of the container 1. Thus, when a nut 10 screwed on the externally threaded portion $8b$ of said tubular member 8 is tightened, the closure assembly 7 will be retained securely in position in port $1b$ and the gasket 11 will provide a dependable seal to prevent leakage between the wall of port 1b and the outer surface of tubular member 8.

Positioned in the tubular member 8 is a poppet valve comprising a valve head 13 adapted to seat on the beveled mouth 12 of the tubular member 8 which defines a valve seat and having a stem 14 preferably formed integral therewith.

The stem 14 is slidably mounted in a bearing bore 16 formed in a wall 16a extending transversely of the bore 8c of member 8 and preferably formed integrally therewith near the mouth 12 thereof, said wall having passageways 17 therethrough to permit passage of fluid.

The bore 8c of tubular member 8 is of enlarged diameter near its outer end as at 8d, defining an annular shoulder 8e. Slidably mounted in said enlarged diameter bore portion 8d is a piston 20 screwed on the threaded end of the stem 14 and adapted to abut against shoulder 8e, the space 18 between wall 16a and piston 20 being in communication with a threaded passageway 23 extending transversely through the tubular member 8 and to which a pipe 6 is connected.

The tubular member 8 is closed by a threaded plug 21 screwed into the correspondingly threaded outer end 22 thereof, said plug being encompassed by a seal ring 20a, a coil spring 28 being positioned in an axial cavity 29 in the plug 21 and reacting against piston 20 normally to urge the valve head 13 away from its seat 12.

The valve head 13 and stem 14 have an axial bore 24 extending completely therethrough, and a transverse bore 27 in communication with axial bore 24 extends through the stem 14 immediately beneath the valve head 13.

The inner end of axial bore 24 is closed as by a plate 25 secured as by riveting as at 26 to the valve head 13.

To use the pressure vessel, the bladder 2 is first precharged with a gas such as air under pressure. As a result, the bladder will expand and press against valve head 13 to move the latter onto its seat 12 against the force exerted by coil spring 28.

When oil under pressure greater than that in the precharged bladder 2 is forced through pipe 6 and passageway 23 into bore 8c of member 8 and thence through passageways 17, it will react against the valve head 13 to move the latter off its seat 12 against the counter force exerted by expanded bladder 2. Thus, the oil will flow into the container 1 to charge the space 5 while compressing the pre-charged bladder 2.

Thereupon, the pipe 6 is closed by a suitable valve (not shown), the space 5 and the bore 8c of member 8 being filled with oil, the spring 28 maintaining the valve head 13 spaced from its seat 12 in open position.

The pressure vessel is now ready for operation to actuate a hydraulic device connected to pipe 6.

To permit flow of oil from the pressure vessel, the valve (not shown) controlling pipe 6 is opened. As a result, the compressed bladder 2 will force oil through open seat 12 and passageways 17 into space 18 of bore 8c and out of passageway 23 through pipe 6 to the device to be operated.

As the oil is under considerable pressure in the container 1, it will pass through the open valve seat 12 at relatively high velocity and consequently the pressure in the chamber 15 of the tubular member below the open valve head 13 will be less than that in the container 1, tending to move the valve head 13 onto its seat 12.

In the usual poppet valve construction, the coil spring used to keep the valve open, such as spring 28, is made of sufficient strength to retain the valve head in open position regardless of the differential in pressure between that in the container 1 and that below the valve head 13 so that the desired quantity of oil may be discharged from the pressure vessel.

The use of such a strong spring is undesirable in that it might prevent seating of the valve head 13 and closing of the valve seat 12 even when the expanded bladder 2 pressed against such valve head 13, which would permit extrusion of the wall of the bladder past the valve seat 12 and into passageways 17, with resultant puncturing of the bladder 2 and failure of the device.

According to the invention, premature and undesired closing of the valve head 13 is prevented even when a weak spring 28 is employed, by the construction above set forth. Thus, a portion of the oil flowing past the valve seat 12 at relatively great velocity passes through bores 27 and bore 24 into the chamber C below the piston 20. This results in a pressure being created in said chamber C, which aids the weak spring 28 in maintaining the valve head 13 spaced from its seat 12 by opposing the closing force created by the difference in pressure between that in the container and the reduced pressure beneath the valve head 13.

Hence, by being able to use a relatively weak spring 28, when the flow of oil has substantially ceased, with resultant reduction in the counter pressure in chamber C, rapid closure of the valve head 13 will occur to prevent extrusion of the bladder, and this only when substantially all of the oil has been expelled.

It is to be noted that three pressure zones Z1, Z2 and Z3 are provided. The first zone Z1 is located in the space 15 below the valve head 13 and the reduced pressure will urge the valve head to closed position; a second zone Z2 in the space 18 which is in communication with the zone Z1 and the outlet 23; and a third zone Z3 located in chamber C which is in communication with zone Z1 and the pressure in which may be greater than in zone Z1 to urge the valve head 13 to open position.

It is to be noted that the passageways 27 are located at a region where the kinetic energy is best carried off and sufficiently close to the valve head 13 so that at the average velocity of flow of the oil the stem 14 and the piston 20 are submitted in zone Z3 in chamber C to the greatest counter-pressure possible, even if it is no longer kinetic, so that the valve head 13 will be balanced at least in part.

The embodiment of the closure assembly 7 shown in FIGS. 4 and 5 is similar in many respects to that shown in FIGS. 1 to 3.

In this embodiment, the stem 14 of the valve head 13, which is slidably mounted in bearing bore 16 in wall 16a, has associated therewith a relatively weak coil spring 34 which encompasses the stem 14 between the wall 16a and an annular member 30 retained against a stop ring 33 secured to the stem 14, the periphery of said member 30 abutting against an annular shoulder 31 in bore 8c. Thus, the spring 34 will normally urge the valve head 13 toward its seat 12, the movement of the valve head 13 away from its seat 12 being limited by the engagement of member 30 against shoulder 31.

The inner end of bore 24 of the stem 14 is closed by a threaded plug 35 and the outer end of the stem is slidably mounted in an axial recess 29 in plug 21, a coil spring 28 in said recess reaching against the end of the stem to urge the valve head 13 away from its seat 12, the recess defining a chamber C.

The passageways 17 are provided with threaded inserts 36 in order that the diameter of the passageway defined by the bore of the insert may be changed.

The operation of the embodiment shown in FIGS. 4 and 5 is similar to that of the embodiment of FIGS. 1 to 3.

Thus, a portion of the fluid under pressure passing the valve seat 12 will be directed through passageway 27 and bore 24 of stem 14 into chamber C to provide a pressure in said chamber C or zone Z3 reacting against the stem 14 to urge the valve head 13 to open position opposed to the pressure in zone Z1 that tends to close the valve head 13.

It is to be noted that when flow is passing the valve head, the latter will be substantially balanced or in equilibrium, as in the embodiment of FIGS. 1 to 3.

By reason of the removable inserts 36 in passageways 17, the flow of fluid through said inserts may be set to maintain a desired relation between the pressures in zones Z1 and Z2 for optimum pressure in zone Z3.

In the embodiments shown in FIGS. 1 to 5, the outlet 23 is arranged laterally, i.e., at the side of tubular member 8. In the embodiment of the closure assembly 7 shown in FIG. 6, the outlet 23a is axially aligned with tubular member 8 and at the outer end thereof.

In this embodiment the tubular member 8 is supported in the container in the same manner as the tubular members 8 of FIGS. 1 to 5.

The stem 14 of valve head 13 is slidably mounted in a bearing bore 16 in wall 16a, the latter having an externally threaded nipple 41 integral therewith and having passageways 17 extending therethrough to provide communication between the space 15 beneath the valve head 13 and the bore 8c of tubular member 8.

Affixed to the nipple 41 and extending axially thereof is an internally threaded socket 40 defining a chamber C in which the counter-pressure Z3 is provided.

The end of stem 14 which extends through the nipple 38 is positioned in said socket and is externally threaded to receive lock nuts 42 which abut against the end of the nipple to limit the movement of the valve head 13 away from its seat 12.

A coil spring 28 positioned in the socket reacts against the lock nuts 42 on stem 14 normally to urge the valve head 13 away from its seat 12.

The embodiment of the closure assembly 7 shown in FIG. 7 is similar to that shown in FIG. 6 except that the valve head 13 is normally urged away from its seat 12 by a coil spring 28a positioned between wall 16a and an annular shoulder 13a adjacent the undersurface of valve head 13 and the bore 27a is in said socket.

The stem 14 which extends through a bearing opening 16 in wall 16a has a collar 43 encompassing its end and secured thereto by a lock nut 44, abutment of collar 43 against the wall 16a limiting the movement of valve head 13 away from its seat 12. The end of the stem with its encompassing collar 43 is positioned in a socket 40 which defines the chamber C in which the counter-pressure Z3 is provided, said collar being secured in a threaded recess 43a in the wall 16b and extending outwardly thereof.

As shown in FIG. 7, the clearance 45 between the collar 43 and the wall of the socket is relatively small to provide a dash pot action in chamber C.

This dash pot effect may be constant along the entire path of movement of the valve head and the collar 43 in socket 40, if the socket is cylindrical and of uniform cross section. It is desired to have the dash pot action greater at the end of the opening movement of the valve head 13, then as shown in FIG. 8, for example, which is otherwise identical to FIG. 7, the socket 40 may be of reduced inner diameter as at 46 as its inner end to reduce the clearance 45 at such region.

As the operation of the embodiments shown in FIGS. 6, 7 and 8 is substantially similar to that of the embodiments of FIGS. 1 to 5, it will not be described.

Although in the illustrative examples herein shown and described the closure assembly has been incorporated into a pressure accumulator, it is of course to be understood that it can be used for other devices, such as pressure transmitting devices which transmit the pressure of one fluid to another fluid of the same or difference nature.

It is also to be understood that although the channeling of fluid according to the illustrative embodiments of the invention shown is used to overcome the tendency of the valve head to close, it could also be used to overcome the tendency of the valve head to open.

As many changes could be made in the above constructions and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A closure assembly for controlling the flow of fluid from a pressure vessel, said closure assembly having an inlet comprising a valve seat and an outlet, a main fluid passageway leading from said inlet to said outlet, a valve stem slidably mounted in said closure assembly, a valve head at one end of the valve stem and movable against said seat completely to close the latter, said stem extending axially of said valve head and having an axial bore therethrough, relatively weak resilient means normally urging said valve head to open position, a balancing chamber in said closure assembly associated with the inner end of said valve stem remote from the root end thereof, said inner end extending into said balancing chamber, whereby said axial bore leads into said balancing chamber, a second fluid passageway in communication at one end with said axial bore in said valve stem and having its other end adjacent the root end of said valve stem, located at a region where the kinetic energy will be best carried off, said second fluid passageway and said axial bore defining a normally open channel leading to said balancing chamber, whereby when said valve head is spaced from said valve seat a portion of the fluid flowing past said valve head into said inlet and through said main fluid passageway, will be channeled through said other end of said second passageway into the axial bore and through the latter into said balancing chamber to react against the inner end of said stem in said chamber to provide a force operatively reacting against the valve head to urge the latter to open position.

2. The combination set forth in claim 1 in which the force provided by such channeled fluid to urge the valve head to open position is substantially equal to the force created beneath the valve head as the fluid flows past the latter and which tends to close the valve head substantially to maintain the valve head in equilibrium.

3. The combination set forth in claim 1 in which said second fluid passageway comprises a transverse bore in communication with the end of the axial bore in said stem adjacent said valve head.

4. The combination set forth in claim 1 in which said closure assembly has three pressure zones, one of said zones being located beneath said valve head, the second zone being in communication with said first zone and said outlet, and the third zone being in communication with said first zone, said channeling means which provide communication between said first and third zones providing a pressure in said third zone which may be greater than that in said first zone.

5. The combination set forth in claim 1 in which said closure assembly comprises a hollow housing having said valve seat at one end, a plug closing the other end of said housing and forming one of the walls of said balancing chamber, said outlet being positioned exteriorly of said pressure chamber and extending laterally into said housing.

6. The combination set forth in claim 1 in which said closure assembly comprises a hollow housing having said valve seat at one end, a wall extending transversely across said housing and having a bore therethrough, a socket affixed to said wall extending outwardly therefrom, said axial stem extending through the bore in said wall into said socket slidably to mount said stem, said wall having passageways therethrough externally of said socket to provide communication for the fluid flowing past said valve seat to said outlet, said channeling means directing the portion of the fluid passing said valve head into said socket to react against said valve stem in said socket.

7. The combination set forth in claim 6 in which said resilient means are provided in said socket reacting against said stem to urge said valve head to open position.

8. The combination set forth in claim 6 in which said resilient means are provided between said valve head and said wall to urge said valve head to open position.

9. The combination set forth in claim 6 in which a plunger is secured to the end of said stem in said socket, the diameter of said plunger being slightly less than that of said socket to provide a dash pot action.

10. The combination set forth in claim 6 in which a plunger is secured to the end of said stem in said socket, the diameter of said plunger and the internal diameter of said socket being so related as to provide an increased dash pot action at the end of the movement of the valve head to open position away from its seat.

References Cited in the file of this patent

UNITED STATES PATENTS

| | | |
|---|---|---|
| 1,720,705 | Waterman | July 16, 1929 |
| 2,385,016 | Mercier | Sept. 18, 1945 |
| 2,801,067 | Mercier | July 30, 1957 |
| 2,889,850 | Eberline | June 9, 1959 |